United States Patent [19]
Mazzarins

[11] 3,718,199
[45] Feb. 27, 1973

[54] SUSPENSION SYSTEM FOR CRAWLER TRACTOR

[75] Inventor: Janis Mazzarins, Macedonia, Ohio

[73] Assignee: General Motors Corporation, Detroit, Mich.

[22] Filed: July 2, 1971

[21] Appl. No.: 159,195

[52] U.S. Cl. ..................................180/9.2 R, 305/27
[51] Int. Cl. ..........................................B62d 55/16
[58] Field of Search ...............180/9.2, 9.54; 305/27

[56] References Cited

UNITED STATES PATENTS

| | | | |
|---|---|---|---|
| 2,405,733 | 8/1946 | Boldt | 180/9.2 R |
| 1,515,167 | 11/1924 | Penn | 305/27 |
| 1,901,269 | 3/1933 | Snow | 305/27 X |
| 2,860,715 | 11/1958 | Bouffort | 305/27 X |

FOREIGN PATENTS OR APPLICATIONS

| | | | |
|---|---|---|---|
| 574,613 | 5/1933 | Germany | 180/9.2 |

*Primary Examiner*—Richard J. Johnson
*Attorney*—J. L. Carpenter et al.

[57] ABSTRACT

A suspension system for resiliently supporting a crawler tractor that includes a plurality of wheel strut assemblies located at each side of the tractor. Each of the wheel strut assemblies have a housing that supports a wheel carrier for oscillatory movement about a longitudinal axis that extends transversely to the tractor and also for vertical movement.

4 Claims, 4 Drawing Figures

PATENTED FEB 27 1973 3,718,199

INVENTOR.
Janis Mazzarins
BY
E. J. Biskup
ATTORNEY

SUSPENSION SYSTEM FOR CRAWLER TRACTOR

Most crawler tractors that are manufactured at the present time include a main frame which is adapted to be supported on a pair of laterally spaced and longitudinally extending roller frames. Each roller frame rotatably carries a plurality of track rollers which serve to support the weight of the tractor and provide track alignment. The rear end of each roller frame is supported in a manner so as to permit it to pivot relative to the other roller frame as the vehicle negotiates irregular terrain thereby maintaining constant drive irrespective of ground conditions.

Over the years, various improvements have been made to the design of the track rollers, however, the reoccurring problem of frequent replacement and repair of the rollers in order to maintain the tractor in proper operating condition has not been solved. As should be apparent, such replacement and servicing of the track rollers is a large expense during the life of a crawler tractor and, accordingly, there have been proposals to eliminate the usual track rollers and substitute therefor large diameter wheels, the maintenance cost of which would be substantially less than that of the presently utilized track rollers.

The present invention is directed to a crawler tractor having large diameter wheels and more particularly to a suspension system for resiliently supporting the large diameter wheels so as to permit the vehicle to maintain track contact with the ground under most conditions of operation. More specifically, the present invention contemplates a suspension system for a crawler tractor that includes a plurality of wheel strut assemblies located at each side of the tractor along an axis parallel to the longitudinal axis of the tractor. Each of the wheel strut assemblies has a housing rigidly attached to the tractor and includes a wheel carrier supported by the housing in a manner so as to permit the wheel carrier to move vertically relative to the tractor and, in addition, pivot about a horizontal axis extending transversely to the aforesaid longitudinal axis. In the preferred form, the wheel carrier is L-shaped, with one leg serving as a support for the track wheel. The other leg of the wheel carrier extends into the housing and is supported by a bearing that provides for the vertical movement as well as the pivotal movement of the track wheel. Spring means attached to the tractor cooperate with a part of the wheel carrier for cushioning movement of the latter.

The objects of the present invention are to provide a suspension system for a crawler tractor which includes a plurality of individual wheel strut assemblies supported so as to move in a vertical direction toward and away from the tractor and also oscillate about a horizontal axis extending transversely to the longitudinal axis of the tractor as the latter traverses irregular terrain; to provide a wheel strut assembly for resiliently supporting a track wheel of a crawler tractor that is movable in a vertical plane and, in addition, can oscillate about a transverse axis; to provide a suspension system for a crawler tractor having large diameter wheels which includes a plurality of independent track wheel strut assemblies, each of which resiliently supports the large diameter track wheel for vertical movement relative to the tractor and also oscillatory movement about a transverse axis; and to provide a suspension system for a crawler tractor having a plurality of independent resiliently supported wheel-carrying struts located on each side of the tractor forwardly of the drive sprocket and interconnected by a link to a track adjusting device which serves to tension the endless track.

Other objects and advantages of the present invention will be more apparent from the following detailed description when taken with the drawing in which.

Figure 1:
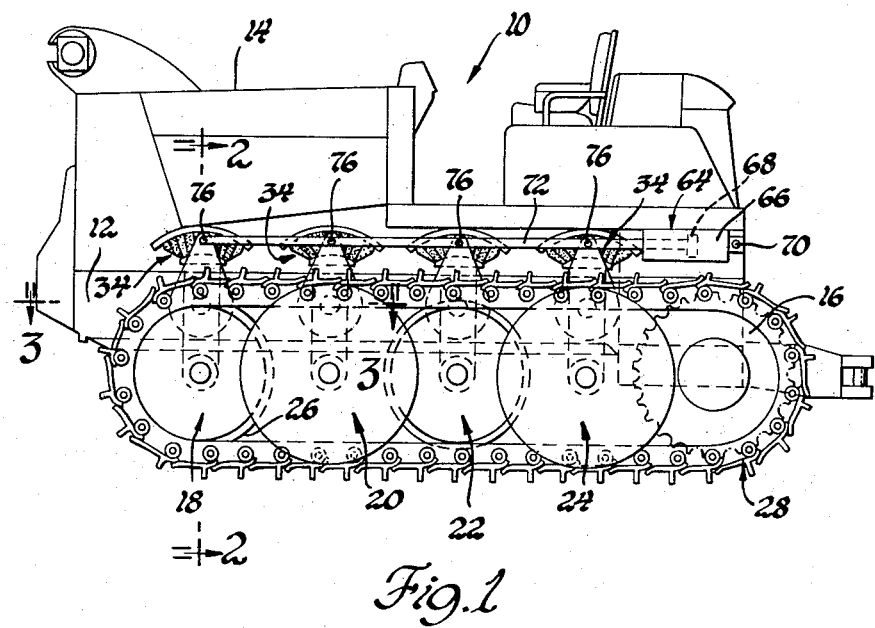
FIG. 1 is a side elevational view showing a crawler tractor incorporating a suspension system made in accordance with the invention.

Referring to the drawing and particularly FIG. 1, a crawler tractor 10 is shown comprising the usual main frame 12, the front end of which has an engine compartment 14 having a conventional internal combustion engine (not shown) that provides drive through a suitable transmission to a pair of laterally spaced drive sprockets, one of which only is shown and identified by the reference numeral 16. Located forwardly of each drive sprocket 16 on each side of frame 12 are a plurality of large diameter track wheels identified by the numerals 18, 20, 22, and 24. It will be noted that track wheels 18 and 22 are each integrally formed with a peripheral radially extended band 26 adapted to be received by a suitable groove formed in the central inner portion of an endless track 28. On the other hand, the track wheels 20 and 24 are each formed with a pair of laterally spaced integral discs 30 and 32 which straddle the track wheels 18 and 22 and engage the inner portions of the endless track 28 so as to provide positive alignment thereof during driving operation of the crawler tractor 10.

Figure 2:
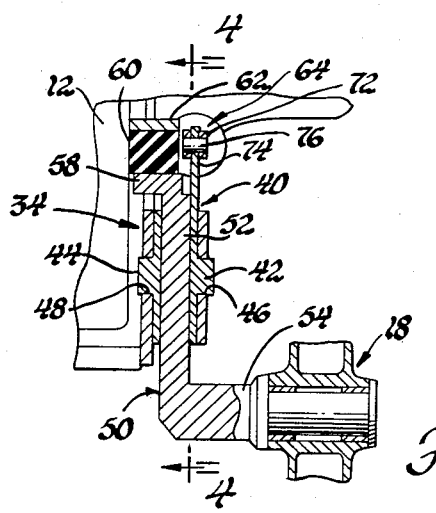
FIG. 2 is an enlarged sectional view taken on line 2—2 of FIG. 1 showing one of the wheel strut assemblies incorporated with the suspension system of FIG. 1.
Figure 3:
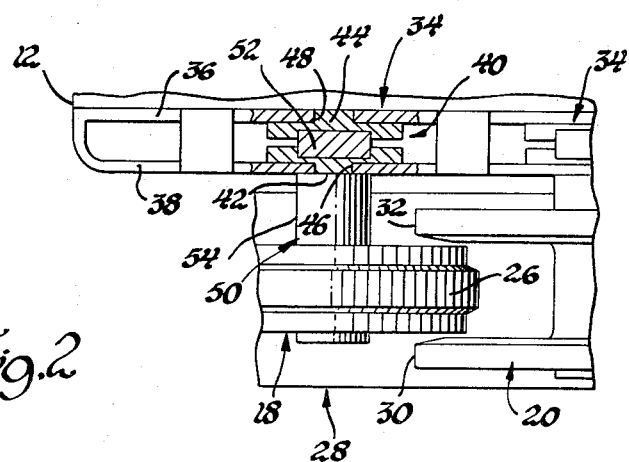
FIG. 3 is an enlarged sectional view taken on line 3—3 of FIG. 1.
Figure 4:
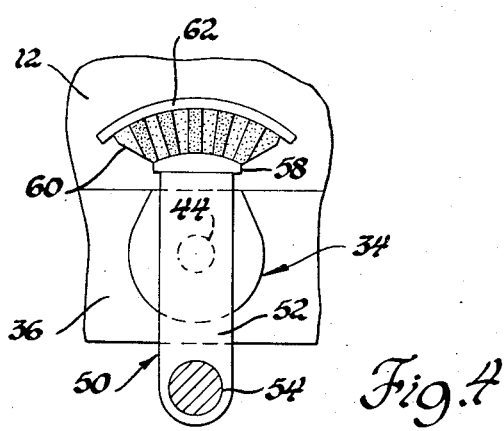
FIG. 4 is a view taken on line 4—4 of FIG. 2.

Each of the track wheels 18, 20, 22, and 24 is supported by a wheel strut assembly 34 which provides for movement of the associated track wheel in a vertical direction as well as pivotal movement about a horizontal axis extending transversely to the longitudinal axis of the tractor. Each of the wheel strut assemblies 34 is identical in construction and as seen in FIGS. 2 through 4, is mounted in a housing which is formed by a pair of vertical plate members 36 and 38 which are rigidly secured to the main frame 12 of the tractor 10. Located between the plate members 36 and 38 is a bearing member 40 formed with a pair of axially aligned pivot pins 42 and 44 which are respectively received within bores 46 and 48 formed in the plate members. A generally L-shaped wheel carrier 50 has a leg 52 slidably received within the bearing member 40, while the other leg 54 extends laterally outwardly and supports the associated track wheel thereon for rotation about a transverse horizontal axis. It will be noted that the leg 52 is rectangular in cross section and is accommodated by a similarly formed opening within the bearing member 40 so as to permit the wheel carrier 50 to have movement relative to the frame 12 in a vertical direction. This movement is additive to the aforementioned oscillatory movement provided by the pivot pins 42 and 44 supported in the plate members 36 and 38. Also, the upper end of the leg 52 terminates with an offset arm 58 which is bonded to the underside of an elastomeric member 60. The upper end of the elastomeric member is secured to the main frame 12 of the tractor 10 through an arcuate plate 62. Thus, when the wheel carrier 50 moves vertically upward, such movement is cushioned by the elastomeric member 60.

A track tensioner or adjusting device 64 is connected with each wheel strut assembly 34 and comprises relatively movable cylinder and piston members 66 and 68. As seen in FIG. 1, the cylinder member 66 is connected by a pivotal connection 70 to the main frame 12 of the tractor 10, while the piston member 68 is pivotally connected through an elongated link 72 to the bearing member 40 of each of the wheel strut assemblies. In this regard, it will be noted that each bearing member 40 includes an integrally formed upwardly extending arm 74 with a pivotal connection 76 for joining the arm 74 to the link 72.

From the above description, it should be apparent that the suspension system made according to the invention is such that when the crawler tractor 10 is operating on flat ground, each of the wheel strut assemblies 34 is located in the positions shown in FIG. 1. However, when the tractor is driven over irregular ground having valleys or ridges, each of the track wheels 18, 20, 22, and 24 will move either upwardly or downwardly relative to the main frame in accordance with ground conditions so as to maintain track engagement with the ground. The aforementioned upward movement of any of the track wheels will be cushioned by the elastomeric member 60 so as to reduce jarring of the tractor operator and thereby provide a smoother ride. As a result, the tractor can operate at increased speeds.

The track tensioner 64 can be of the type shown in my U.S. Pat. No. 2,837,380, which is assigned to the assignee of this invention, and consists of a nitrogen gas recoil cylinder and hydraulic jack adjuster. This amounts to a two-part construction so that on the reaction side of the piston, nitrogen absorbs all shocks and on the return side, semi-fluid grease stops and retains the position of the piston and, accordingly, maintains track tension.

Various changes and modifications can be made in this construction without departing from the spirit of the invention. Such changes and modifications are contemplated by the inventor and he does not wish to be limited except by the scope of the appended claims.

I claim:

1. A wheel strut assembly for resiliently supporting the track wheel of a crawler tractor comprising, a housing having an upper end and a lower end, said housing adapted to be rigidly secured to the crawler tractor and having a bearing member supported for pivotal movement about a horizontal axis located intermediate said upper and lower ends of said housing and extending transversely to the longitudinal axis of the tractor, a wheel carrier having one end thereof serving as an axle for rotatably supporting the track wheel, the other end of the wheel carrier being generally rectangular in cross section and supported by said bearing member for vertical movement relative thereto and for pivotal movement with said bearing member about said horizontal axis, and spring means adapted to be attached to said crawler tractor and cooperating with a part of the wheel carrier for cushioning movement of the wheel carrier as the latter moves relative to the bearing member.

2. A wheel strut assembly for resiliently supporting the track wheel of a crawler tractor comprising, a housing having an upper end and a lower end, said housing adapted to be rigidly secured to the side of the crawler tractor and having a bearing member supported for pivotal movement about a horizontal axis located intermediate said upper and lower ends of the housing and extending transversely to the longitudinal axis of the tractor, an L-shaped wheel carrier having one leg thereof serving as an axle for rotatably supporting the track wheel, the other leg of the wheel carrier being generally rectangular in cross section and supported by said bearing member for vertical movement relative thereto along the longitudinal axis thereof and for pivotal movement with said bearing member about said horizontal axis, and spring means adapted to be attached to said crawler tractor and cooperating with said other leg of the wheel carrier for cushioning movement of the wheel carrier as the latter moves relative to the bearing member.

3. A suspension system for a crawler tractor including a plurality of wheel strut assemblies located at each side of said tractor along an axis parallel to the longitudinal axis of the tractor, each of said wheel strut assemblies having a housing rigidly attached to the tractor, a wheel carrier supported by said housing for oscillatory movement about a first horizontal axis extending transversely to said longitudinal axis and for movement along a vertical axis, said wheel carrier having the form of a strut with one end thereof serving to support a track wheel for rotation about a second horizontal axis located below said first horizontal axis, a bearing member mounted in said housing for pivotal movement about said first horizontal axis and supporting the other end of the wheel carrier for relative movement along said vertical axis, spring means carried by the tractor for cushioning movement of said wheel carrier along said vertical axis, a drive sprocket supported on each side of the tractor in longitudinal alignment with the track wheels located on the same side of the tractor, an endless track entrained about each drive sprocket and the associated track wheels, and a track adjusting device mounted on the tractor and pivotally connected to the bearing member of each of the wheel strut assemblies for tensioning said endless track.

4. A suspension system for a crawler tractor including a plurality of wheel strut assemblies located at each side of said tractor along an axis parallel to the longitudinal axis of the tractor, each of said wheel strut assemblies having a housing rigidly attached to the tractor, a wheel carrier supported by said housing for oscillatory movement about a first horizontal axis extending transversely to said longitudinal axis and for vertical movement, said wheel carrier being L-shaped with one leg serving to support a track wheel for rotation about a second horizontal axis located below said first horizontal axis, a bearing member mounted in said housing for pivotal movement about said first horizontal axis and supporting the other leg of the wheel carrier for vertical movement, spring means carried by the tractor for cushioning vertical movement of said wheel carrier, a drive sprocket supported on each side of the tractor in longitudinal alignment with the track wheels located on the same side of the tractor, an endless track entrained about each drive sprocket and the associated track wheels, a link member, and a track adjusting device mounted on the tractor and pivotally connected to the bearing member of each of the wheel strut assemblies by said link member for tensioning the endless track.

* * * * *